(12) United States Patent
Oldham et al.

(10) Patent No.: US 8,719,135 B2
(45) Date of Patent: *May 6, 2014

(54) REAL-TIME INSURANCE ESTIMATE BASED ON NON-PERSONAL IDENTIFYING INFORMATION

(71) Applicant: Allstate Insurance Company, Northbrook, IL (US)

(72) Inventors: Craig Oldham, Chicago, IL (US); Michael Frederick Hobart, Round Lake Beach, IL (US); Dean Krieter, Rolling Meadows, IL (US); Javier Porras, Morton Grove, IL (US); Jeffrey Robert Herrmann, Gurnee, IL (US); John Paul Wojcik, Huntley, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/890,434

(22) Filed: May 9, 2013

(65) Prior Publication Data

US 2013/0246101 A1    Sep. 19, 2013

Related U.S. Application Data

(63) Continuation of application No. 13/619,205, filed on Sep. 14, 2012, which is a continuation of application No. 13/554,702, filed on Jul. 20, 2012, now Pat. No. 8,315,934, which is a continuation of application No. 13/274,801, filed on Oct. 17, 2011, now Pat. No. 8,249,968, which is a continuation of application No. 12/031,927, filed on Feb. 15, 2008, now Pat. No. 8,065,169.

(51) Int. Cl.
*G06Q 40/00*    (2012.01)

(52) U.S. Cl.
USPC .......................................... 705/35; 705/36 R

(58) Field of Classification Search
USPC ...................................................... 705/35–40
See application file for complete search history.

(56) References Cited

U.S. PATENT DOCUMENTS

| 4,567,359 A | 1/1986 | Lockwood |
| 4,674,041 A | 6/1987 | Lemon et al. |

(Continued)

FOREIGN PATENT DOCUMENTS

EP    0947939 A2    10/1999

OTHER PUBLICATIONS

Kiosk Marketplace, "Kiosk Remote Monitoring", downloaded Oct. 14, 2005 from <http://www.kioskmarketplace.com/products_3397.htm>, 2 pages.

(Continued)

*Primary Examiner* — Thu Thao Havan
(74) *Attorney, Agent, or Firm* — Banner & Witcoff, Ltd.

(57) ABSTRACT

Methods and systems for providing estimated insurance quotes/premiums are described herein. After analyzing rate factors, a subset of rate factors are selected that yield a fairly accurate estimated insurance premium from a minimum amount of information easily obtainable from a user. The user inputs a value from a predetermined set of allowable inputs (value input filter). After receiving and analyzing the user inputs, the system generates one or more estimates and displays the one or more estimates to the user, e.g., via a web page. When multiple estimates are provided, the multiple estimates may differ based on the level of coverage, add-on features, or both. Readily known non-personal identifying information is preferably requested and used, thereby alleviating privacy concerns while still being able to provide an estimate to the user very quickly, e.g., under 30 seconds, once all the requested information is obtained.

22 Claims, 15 Drawing Sheets

(56) References Cited

U.S. PATENT DOCUMENTS

| | | | |
|---|---|---|---|
| 4,775,935 | A | 10/1988 | Yourick |
| 5,206,804 | A | 4/1993 | Thies et al. |
| 5,283,865 | A | 2/1994 | Johnson |
| 5,493,490 | A | 2/1996 | Johnson |
| 5,515,268 | A | 5/1996 | Yoda |
| 5,537,315 | A | 7/1996 | Mitcham |
| 5,845,256 | A | 12/1998 | Pescitelli et al. |
| 5,857,175 | A | 1/1999 | Day et al. |
| 5,890,175 | A | 3/1999 | Wong et al. |
| 6,041,310 | A | 3/2000 | Green et al. |
| 6,055,513 | A * | 4/2000 | Katz et al. ............. 705/26.41 |
| 6,243,687 | B1 | 6/2001 | Powell |
| 6,453,302 | B1 | 9/2002 | Johnson et al. |
| 6,691,915 | B1 | 2/2004 | Thaxton et al. |
| 6,869,362 | B2 * | 3/2005 | Walker et al. ............... 463/25 |
| 6,945,457 | B1 | 9/2005 | Barcelou |
| 8,065,169 | B1 * | 11/2011 | Oldham et al. ............... 705/4 |
| 2001/0034607 | A1 | 10/2001 | Perschbacher, III et al. |
| 2002/0046064 | A1 | 4/2002 | Maury et al. |
| 2002/0099659 | A1 | 7/2002 | Swentor |
| 2002/0120476 | A1 | 8/2002 | Labelle et al. |
| 2002/0188484 | A1 | 12/2002 | Grover et al. |
| 2003/0187768 | A1 | 10/2003 | Ryan et al. |
| 2004/0128172 | A1 | 7/2004 | Van Cleave et al. |
| 2004/0138924 | A1 | 7/2004 | Pristine |
| 2004/0148203 | A1 | 7/2004 | Whitaker et al. |
| 2004/0186744 | A1 | 9/2004 | Lux |
| 2004/0204954 | A1 | 10/2004 | Lacko |
| 2004/0254861 | A1 | 12/2004 | Pentel |
| 2005/0091175 | A9 | 4/2005 | Farmer |
| 2005/0096972 | A1 | 5/2005 | Baechtiger |
| 2005/0108062 | A1 | 5/2005 | Higgins |
| 2005/0137942 | A1 | 6/2005 | LaFleur |
| 2005/0256863 | A1 | 11/2005 | Crivella et al. |

OTHER PUBLICATIONS

Info Touch Technologies Corp., "IFT-PPK-05 model kiosk", 2003, 1 page.

WireSpring, "Digital Signage", downloaded Oct. 14, 2005 from <http://www.wirespring.com/Solutions/digital_signage.html>, 2 pages.

Kiosk Marketplace, "Germany: Buying insurance directly via kiosks", by Eckhard Reimann, Aug. 27, 2001, downloaded Oct. 14, 2005 from <http://www.kioskmarketplace.com/news_printable.htm?id=10638>, 2 pages.

Kiosk Marketplace, "Auto insurance available through Circle K kiosks", Jun. 11, 2002, downloaded Oct. 14, 2005 from <http://www.kioskmarketplace.com/news_printable.htm?id=12720>, 1 page.

Kiosk Marketplace, "Kiosks part of Indian insurance company scheme", Jul. 11, 2002, downloaded Oct. 14, 2005 from <http://www.kioskmarketplace.com/research.htm?article_id12992&pavi . . . >, 2 pages.

ATMmarketplace.com, "7-Eleven's Vcom wins raves at RD", by Ann All, Nov. 13, 2002, downloaded Oct. 14, 2005 from <http://www.atmmarketplace.com/news_printable.htm?id=14087>, 4 pages.

ATMmarketplace.com, "7-Eleven hopes to drive Vcom revenues with auto insurance", Nov. 19, 2002, downloaded Oct. 14, 2005 from <http://www.atmmarketplace.com/news_printable.htm?id=14140>, 2 pages.

Kiosk Marketplace, "Consumer advocates question insurance sales at kiosks", Dec. 20, 2002, downloaded Oct. 14, 2005 from <http://www.kioskmarketplace.com/news_printable.htm?id=14411>, 2 pages.

Kiosk Marketplace, "Software's remote control", by Christine Zimmerman, Aug. 22, 2003, downloaded Oct. 14, 2005 from <http://www.kioskmarketplace.com/news_printable.htm?id=16624>, 6 pages.

Kiosk Marketplace, "Info Touch Technologies to deploy kiosks in Speedway SuperAmerica stores", Jan. 18, 2005, downloaded Oct. 14, 2005 from <http://www.kioskmarketplace.com/news_printable.htm?id=21973>, 1 page.

WireSpring, "Syndicating content to your kiosk or digital sign network", by Bill Gerba, May 5, 2005, downloaded Oct. 14, 2005 from <http:www.wirespring.com/dynamic_digital_signage_and_interactive_k . . . >, 2 pages.

Kiosk Marketplace, "See me, touch me, heal me", Jul. 19, 2005, downloaded Oct. 14, 2005 from <http:www.kioskmarketplace.com/news_printable.htm?id=23617>, 4 pages.

Kiosk Marketplace, "Cottage Health System selects Galvanon's MediKiosk", Sep. 7, 2005, downloaded Oct. 14, 2005 from <http://www.kioskmarketplace.com/news_printable.htm?id=23961>, 1 page.

Kiosk Marketplace, "The 2005 Kiosk Awards: Entries for Best Retail Kiosk, Best Financial Kiosk", by Cecilia Crosby, Sep. 16, 2005, downloaded Oct. 14, 2005 from <http://www.kioskmarketplace.com/news_printable.htm?id=24022>, 4 pages.

Egol, Len, "Let's get personal. (personalized marketing)(Special Focus on Printing/Production)", Nov. 1, 1991, downloaded from <http://www.highbeam.com/library/doc3.asp?DOCID=1G1.11514255&num=1&ctrlInfo+R . . . > on Jun. 30, 2006, 6 pages.

"CompuServe Unveils Videotext Shopping Mall", Videodisc and Optical Disk Magazine, Sep.-Oct. 1984, vol. 4—No. 5, pp. 344-345.

Nicole Miles, "Report Forecasts Widespread Videotex Use by 1990", Discount Store News, Jul. 18, 1988, 2 pages.

Vic Cherubini, "Disk-Based Catalogs . . . A New Way to Communicate Sales & Technical Information", Dallas Technology Magazine, vol. 1, No. 6, Sep. 1991, 2 pages.

Jan Gecsel, "The Architecture of Videotex Systems", published in 1983 by Prentice-Hall, Inc., 180 pages.

Victor F. Cherubini, "Expert Systems Assist Corrosion Specifications, Shared Access to Group Expertise", Pipeline and Gas Journal, Jun. 1989, 13 pages.

Geoff Hutt, "One Step Beyond Videotex: BL Systems Breaches the User-Enjoyable Frontier", Videodisc/Videotex, vol. 4, No. 1, Jan./Feb. 1984, pp. 37-53.

Stephen Nelson, "Using Prodigy", Que Corporation, 1990, 314 pages.

Gail Kolb, "The Making and Marketing of CATALOGIA: The Center for Advanced Shopping", Videodisc/Videotex, vol. 3, No. 1, Winter 1983, pp. 20-30.

Robert N. Mayer, "The Growth of the French Videotex System and Its Implications for Consumers", Journal of Consumer Policy, 1988, pp. 55-83.

"Videodisc", Videodisc and Optical Disk, vol. 4, No. 4, Jul.-Aug. 1985, pp. 244-247.

"Interactive Video Programs Help Boost Sales of Lawn and Garden Products", Videodisc and Optical Disk, vol. 5, No. 1, Jan.-Feb. 1985, pp. 14-19.

Final office action for U.S. Appl. No. 12/242,028 mailed Oct. 26, 2011.

Non-Final OA for U.S. Appl. No. 13/619,205 mailed Apr. 5, 2013.

Internet Archive's Wayback Machine, "The General, Auto Insurance Quote for California, Ohio, Georgia, Florida & Tennessee—Online Car Insurance Quotes—Homepage", May 10, 2006, downloaded Apr. 6, 2013 from <http://www.thegeneral.com, p. 1.

Internet Archive's Wayback Machine, "The General, Questions About Auto Insurance—Car Insurance Company", May 10, 2006, downloaded Apr. 6, 2013 from <http://www.thegeneral.com/com/helpquestions, pp. 1-4.

* cited by examiner

REAL-TIME INSURANCE ESTIMATE BASED ON NON-PERSONAL IDENTIFYING INFORMATION

CROSS-REFERENCE TO RELATED APPLICATIONS

This application is a continuation of application Ser. No. 13/619,205, filed Sep. 14, 2012, which is a continuation of application Ser. No. 13/554,702, filed Jul. 20, 2012, which is a continuation of U.S. Pat. No. 8,249,968, issued Aug. 21, 2012, which is a continuation of U.S. Pat. No. 8,065,169, issued Nov. 22, 2011, each having the title "Real-Time Insurance Estimate Based on Non-Personal identifying Information."

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to insurance. More specifically, the invention provides methods and systems for providing in real-time an estimated insurance premium to a user based on a minimum amount of non-personal identifying information. The invention may be used, for example, to provide estimates of premiums for auto insurance, motorcycle insurance, homeowner's insurance, condo insurance, and renter's insurance, among others. The invention is preferably accessed by a user over a computer network such as the Internet.

BACKGROUND OF THE INVENTION

Consumers often indicate that obtaining an insurance product can be a time consuming and tedious process, requiring the consumer to provide detailed information that often is not readily remembered by or available to the consumer. The consumer must research information requested by an insurance agent in order to obtain a reliable indication of how much the consumer's insurance premium might be. As a result, consumers can be hesitant to research insurance rates because of the time believed to be involved with obtaining an insurance quote.

A previous approach involved obtaining in-depth information about the consumer in order to develop a price estimate. Because insurance, e.g., auto insurance, is tailored to the individual applying for insurance and/or the property being insured, the individual would provide his or her driver's license number, home address, VIN number for the vehicle(s) and other specific personal information. Based on this specific personal information, the agent or insurance company would use sophisticated quoting tools and charts to develop a quote. The extent of this personal information creates a barrier to marketing and lead generation because it is time-consuming for the customer to provide. Additionally, as consumers' sensitivity to providing personal information has increased, consumers increasingly do not want to provide such extensive information in order to shop for insurance.

As an alternative to providing detailed information to obtain a quote, consumers often request a less precise estimate of what his or her insurance premium might be. However, given the large number of factors that must be taken into account in determining an insurance quote, providing even an estimate can be a difficult task. The basic tension in providing a meaningful estimated insurance quote to a member of the public, who is not an existing customer of an insurance company, is accuracy versus speed. Both elements of this equation are largely dependent upon the amount of information provided—the information which forms the basis for an estimated quote. If the person submits a great deal of information to the process then the estimate will likely be much more accurate, but the process will also be very time consuming and cumbersome to the person. At the other end of the spectrum, if the person submits very little information to the quoting process then the process is much more "user friendly" and quicker; however, the estimate may not be very accurate.

Inaccurate estimates result in lower chances of closing on a new policy with the consumer as well as decreased customer satisfaction. When the consumer subsequently provides more detailed information and the policy for that individual is developed, the price might not meet the expectations of the consumer because his or her expectations were premised on the estimate that turned out to be inaccurate.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, aspects of the present invention are directed to methods and systems that quickly develop an insurance estimate based on a minimum of readily known information obtained from an individual consumer. The individual consumer can self-declare and input the information according to predetermined value filters. Through a range of choices provided to the individual consumer, the consumer can select from a number of coverage options that most accurately reflect his or her needs. According to an aspect of the invention, the individual consumer does not need to identify herself or provide information which could be used to identify her, thereby avoiding privacy concerns on the part of the consumer. That is, only readily known information is requested so the user does not have to track down or research the information, and only non-personal identifying information is requested, thereby alleviating privacy concerns while still providing an estimate to the user quickly, e.g., under 30 seconds.

A first aspect of the invention describes a method for providing an insurance estimate by analyzing a rate model to determine, for each of a plurality of rate factors, an insurance risk associated with multiple different values of the rate factor. The method determines one or more assumptions based on historical rate plan data, where each assumption is true for at least a predetermined percentage of historical insured individuals in the historical rate plan data, and selects a subset of the plurality of rate factors that, combined with the one or more assumptions, yields a substantially accurate insurance estimate when a value input filter corresponding to the rate factor is applied to the historical rate plan data and is re-input into the rate model. Upon receiving user input for each of the subset of the plurality of rate factors using each corresponding value input filter, the method determines an estimated insurance premium using the rate model based on the received user input.

According to other aspects of the invention, the method may determine one of the value rate filters by grouping values of the corresponding rate factor that yield minimal risk differentiation. Each rate factor in the subset of the plurality of rate factors preferably corresponds to non-personal identifying data.

According to an aspect of the invention, an automobile insurance estimate is provided and the subset of the plurality of rate factors consists of: zip code, gender, marital status, driving history, vehicle year, vehicle make, vehicle model, ownership status of real estate, credit worthiness, and length of time with current automobile insurer.

These and other aspects of the invention are described in more detail below to provide methods and systems for providing estimated insurance quotes and/or premiums.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 10 illustrates a screen shot of a user interface according to an illustrative aspect of the invention.

FIG. 11 illustrates a screen shot of a user interface according to an illustrative aspect of the invention.

FIG. 15 illustrates a screen shot of a user interface according to an illustrative aspect of the invention.

FIG. 16 illustrates a screen shot of a user interface according to an illustrative aspect of the invention.

FIG. 17 illustrates a screen shot of a user interface according to an illustrative aspect of the invention.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Aspects of the invention provide an insurance estimating tool that calculates an estimated insurance quote for a consumer without requiring the consumer to disclose personally identifying information. The consumer does not have to disclose name, social security number (SSN), address, vehicle VIN number, or other information unique to that person or specific property being insured. Instead the consumer is allowed to self-declare general characteristics about him or herself or the property. The specifically requested characteristics are preferably highly-predictive of the consumer's potential insurance quote and allow for the development of a range of estimates from which the consumer can select one that best applies to him or her.

Figure 1:
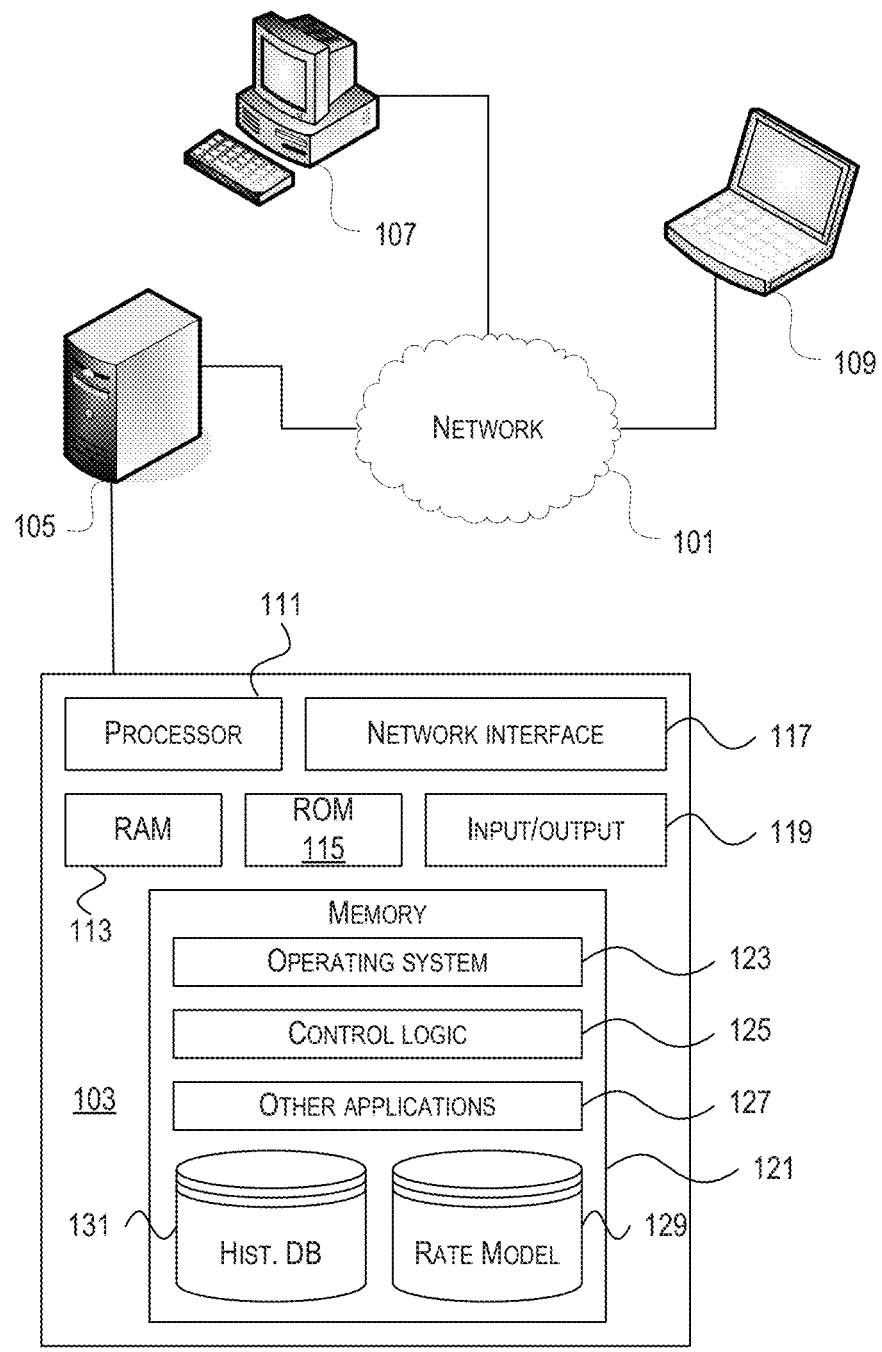
FIG. 1 illustrates a system and network architecture that may be used according to one or more illustrative aspects of the invention.

FIG. 1 illustrates one example of a network architecture and data processing device that may be used to implement one or more illustrative aspects of the invention. Various components 103, 105, 107, and 109 may be interconnected via a network 101, such as the Internet. Other networks may also or alternatively be used, including private intranets, local LANs, wireless WANs, personal PANs, and the like. The components may include an insurance rate server 103, web server 105, and client computers 107, 109. Rate server 103 provides overall control and administration of providing insurance quotes and estimates to users according to aspects described herein. Rate server 103 may be connected to web server 105 through which users interact with and obtain insurance rates. Alternatively, rate server 103 may act as a web server itself and be directly connected to the Internet. Rate server 103 may be connected to web server 105 through the network 101 (e.g., the Internet), or via some other network (not shown). Users may interact with the rate server 103 using remote computers 107, 109, e.g., using a web browser to connect to the rate server 103 via one or more externally exposed web sites hosted by web server 105. Servers and applications may be combined on the same physical machines, and retain separate virtual or logical addresses, or may reside on separate physical machines. FIG. 1 illustrates but one example of a network architecture that may be used, and those of skill in the art will appreciate that the specific network architecture and date processing device used may vary, and are secondary to the functionality that they provide, as further described below.

Each component 103, 105, 107, 109 may be any type of known computer, server, or data processing device. Rate server 103, e.g., may include a processor 111 controlling overall operation of the rate server 103. Rate server 103 may further include RAM 113, ROM 115, network interface 117, input/output interfaces 119 (e.g., keyboard, mouse, display, printer, etc.), and memory 121. Memory 121 may further store operating system software 123 for controlling overall operation of the data processing device 103, control logic 125 for instructing rate server 103 to perform aspects of the invention as described herein, and other application software 127 providing secondary support or other functionality which may or may not be used in conjunction with aspects of the present invention. The control logic may be referred to herein as the rate server software 125. Functionality of the rate server software may refer to operations or decisions made automatically based on rules coded into the control logic, or made manually by a user providing input into the system.

Memory 121 may also store data used in performance of one or more aspects of the invention, including a rate model database 129 and a historical database 131. Rate model database 129 may define rules, restrictions, qualifications, and conditions which, when met, result in providing a customer an insurance product at a given rate, i.e., when the customer pays an insurance premium as determined by a rate model or rate models encoded within the rate model database 129. For example, one rule might indicate that a married male driver has reduced insurance as compared to a single male driver, or that a driver under the age of 25 must pay a higher rate than a driver who is 25 years old or older. Historical database 131 stores information about what actual customers have paid for insurance in the past, as well as the information on which those insurance prices were based, e.g., age, insured products, types of insurance, length of term with insurance company, etc. In some embodiments, the rate model database may include the historical database. That is, the information can be stored in a single database, or separated into different logical, virtual, or physical databases, depending on system design.

Those of skill in the art will appreciate that the functionality of data processing device 103 as described herein may be spread across multiple data processing devices, for example, to distribute processing load across multiple computers, to segregate transactions based on geographic location, insurer, insured, type of insurance, etc. In addition, one or more aspects of the invention may be embodied in computer-usable data and computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

As previously discussed, aspects of the invention provide a tool that calculates, determines, or develops an insurance estimate for a consumer without requiring the consumer to disclose personally identifying information. Unlike previous approaches used to estimate insurance premium, aspects of the present invention provide an insurance estimate based on a few pieces of information readily available to the consumer without requiring the consumer to perform exhaustive research to obtain the requested information. The user can preferably enter the information through an intuitive and user-friendly web-based application.

Figure 2:
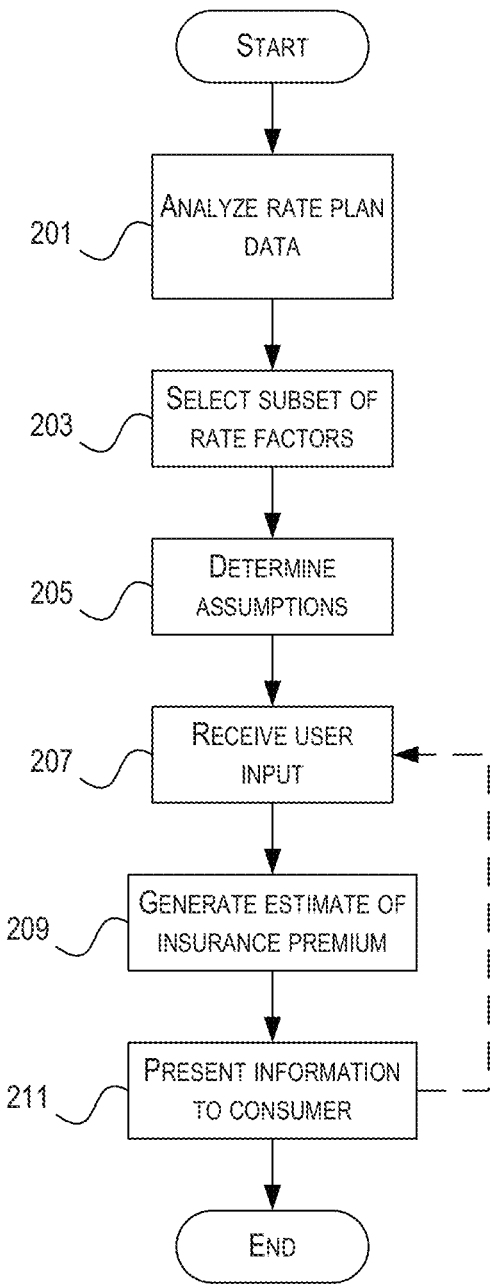
FIG. 2 illustrates a method of providing an insurance estimate according to an illustrative aspect of the invention.

FIG. 2 illustrates a method for providing an insurance estimate according to one or more aspects of the invention. Initially, in step 201, an insurance provider analyzes the rate model in conjunction with the historical rate data to determine, for each of a plurality of rate factors, an insurance risk associated with multiple different values of the rate factor. A rate factor, as used herein, refers to any variable or information associated with a consumer that can affect the price the consumer might pay for an insurance product. Rate factors may include, e.g., age, gender, geographic location, marital status, car make, car model, car year, YIN number, accident history, credit history and/or rating, occupation, educational history, educational performance, and criminal record, among other things. This is not an exhaustive list of rate factors, but rather is illustrative of the type of information that an insurance company might request prior to providing an insurance contract to a customer. During step 201, each possible rate factor is analyzed to determine whether it provides meaningful risk differentiation based on various input values and, if so, it is determined what input values should be grouped together to simplify the input process while providing meaningful information from which an insurance estimate could be based.

As an example, a consumer's age may provide a good indication of the risk associated with that consumer. I.e., an 18 year old driver typically has a much higher risk of getting into an automobile accident than a 40 year old driver. However, an 18 year old driver might have a risk very similar to that of a 19 year old driver (all other things being equal), and thus the system might not care whether a consumer is 18 or 19 years old for purposes of providing an estimate. As a result, those performing the analysis may determine that a consumer's age should be included in the estimation process, but that a specific age is not required. Instead, the user might only be required to indicate an age range he or she is in. Alternatively, a user may be required to indicate an exact age.

As another example, a consumer's driving history may be relevant, but there might be little differentiation in risk among all users who have had 2 or more accidents or moving violations in the past five (or some other number) of years. Thus, while driving history may also be required, the consumer might only be required to provide an indication of whether the consumer has had 0, 1, or greater than 1 accidents or moving violations in the past five years. For example, two or more accidents and violations within the last five years for a single driver all get approximately the same rate, because having 3 or 4 accidents does not have a significant impact on the quote as compared to 2 accidents because few drivers have more than 2 incidents. The three possible values of 0, 1, and 2+ are defined by and referred to as a value input filter corresponding to the driving history rate factor. Value input filters also act to ensure that valid and/or understandable input is received from a user (e.g., the response "I don't recall any" would not be particularly helpful to an automated insurance estimation tool).

In step 203, it is determined which rate factors provide the best indication of resulting insurance rates, as well as levels of those rate factors that provide meaningful variations in risk. That is, the analysis in step 203 may include a two-part process: first, determine which rate factors act as the best indicators of risk, and second, determine cutoff values or ranges within that rate factor that provide more meaningful differentiation between levels of risk. There are different combinations of rate factors that might result in fairly accurate insurance estimates. However, in order to encourage users to complete the insurance estimation process, the insurer preferably selects only rate factors that do not yield personal identifying information, e.g., name, street address, telephone number, driver's license number and/or social security number are not used. The possible rate factors may be ranked and selected so that a minimum number of rate factors may be used to provide the best indication of potential risk regarding a consumer. Factors may also be selected on the basis of whether the consumer is likely to object to providing the information in an informal estimation process, and also based on whether the consumer is likely to have the information readily available (as opposed to requiring further or subsequent research of information not immediately available to the consumer). Other bases may also be used to select rate factors for use in the estimation process.

According to an illustrative embodiment of the invention, the following rate factors and value input filters, based on information obtained from prospective driver(s), may be used in determining an automobile insurance estimate:

TABLE 1

Auto Insurance Rate Factors and Value Input Filters

| Rate Factor | Value Input Filter |
| --- | --- |
| Zip Code | Compare against known list of valid zip codes |
| Gender | Male, Female |
| Marital Status | Single, Married |
| Age | Yearly increments from 16-55, or 55+ |
| Accidents/Violations in past 5 years | 0, 1, 2+ |
| Car Year | Valid Year, e.g., 1970-Present year |
| Car Make | Manufacturer known to have made at least 1 car during selected Car Year |
| Car Model | Model of car known to have been made by manufacturer selected as Car Make |
| Residence | Own, Rent, Neither |
| General Bill Payment History | Excellent, Very Good, Good, Fair, Poor |
| Length of continuous auto insurance | 0, 0.5, 1, 2, 3+, 5+, 10+ years |

Next, in step 205, based on the selected rate factors and value input filters, assumptions are determined that are likely to yield realistic estimates based on the value input filters for the selected rate factors. By using key assumptions derived from the analyzed historical data, the quoting process is quicker and more efficient than previous solutions. The historical data is analyzed to determine the information corresponding to the previous consumers that yields accurate results when the previous consumers' information is used as input back into the estimation process. That is, the historical data is analyzed to determine what assumptions need to be made, after using the historical data as input into the estimation process, to yield realistic estimates when the historical data is plugged back into the rate model 129. Assumptions can include selections made by a majority of previous consumers regarding insurance options, or may include information known or associated with a majority of previous insurance purchasers. For example, the historical data may be analyzed to determine what level of insurance previous consumers selected, e.g., $100K per person/$300K per accident, $500 deductible, medical payment options, etc. The historical data may also be analyzed to determine what information is common to most consumers seeking automobile insurance, e.g., that all drivers were licensed at age 16 and have verifiable driving records, and/or that no driver in the household has had their license suspended or revoked in the past 5 years.

As an example, the historical data may include actual rates paid by previous consumers, as well as those consumers' ages, driving histories, car information, etc. Information for one or more of the previous consumers is used as input into the estimation model, e.g., the rate model 129. The results are compared with the actual rates the consumer paid, which can then be used to determine which assumptions need to be made so that the actual rate and the estimated rate are within a predetermined amount of each other. The predetermined amount can be any percentage or dollar amount based on the desired accuracy of the system.

As another example, assumptions may be generated from information corresponding to the previous consumers not related to the selected rate factors, e.g., selected insurance levels, miles driven to work, etc. In such an embodiment, the previous consumers need not necessarily be used as input back into the rate model to determine assumptions, but rather the assumptions may be generated based on information common to many previous customers. That is, historical data trends may be used to generate assumptions for future estimates.

According to an illustrative embodiment, the following assumptions may be used during the estimation process:

Driver Assumptions: 1. All drivers were licensed at age 16 and have verifiable driving records. 2. No driver in the household has had their license suspended or revoked in the past 5 years (MD and WA: past 3 years). 3. All drivers reside at the primary residence and all vehicles are garaged and/or parked at that residence. The primary residence is assumed to be within the ZIP code entered. 4. For accidents and violations entered by the consumer, the insurer has assumed that all accidents are "at-fault" accidents, and that all violations are minor. The insurer may also assume that all accidents and violations occurred between 2 and 5 years ago, i.e., that none of them were in the past two years.

Vehicle Assumptions: 1. All vehicles identified in the estimate are each driven at least 7,500 miles annually. (CA and CO, and/or other states as appropriate: 12,000 miles annually), and were purchased in the same year as the model year. 2. All vehicles identified in the estimate are driven to and from work (less than or equal to 20 miles each way). If the consumer is 55 or older and retired, it's assumed the vehicle driven is driven solely for pleasure. 3. Unless otherwise noted, coverages and deductibles selected will apply to each vehicle. 4. The estimate is based on the year, make, and model of the vehicle and does not consider the specific sub-model details.

Personal Assumptions: 1. If the consumer indicates that he or she owns his or her primary residence, it's assumed to be a single family home or condominium. 2. The insurance score assumed for this estimate is based on the consumer's self-assessment of General Bill Payment History. 3. Continuous insurance coverage is assumed to have been with the same insurance carrier and not with multiple insurance carriers. Carrier is assumed to be a "standard" insurance company. 4. If the consumer indicates that s/he currently carries auto insurance, it is assumed the limits of the Bodily Injury Liability coverage are equivalent to the most popular limits among customers in the consumer's state ($100,000 per person/$300,000 per accident in most states).

Steps 201-205 may be performed in any order, or may be combined or split into further levels of granularity. For example, assumptions may be determined prior to selecting the rate factors to use in the estimation process, or the assumptions and selection may be performed at the same time.

In step 207 a user, e.g., a prospective insurance purchaser, provides input to rate server software 125 (e.g., via web server 105) for each of the selected rate factors. The input is provided according to the value input filter corresponding to each selected rate factor. Then, in step 209, the rate server 103 determines an estimated amount of an insurance premium for the consumer based on information stored in the rate model 129. Step 209 may include determining one estimate or a range of insurance estimates based on a variety of options the user may select as part of the insurance product. For example, estimates may be provided for varying levels of protection ($100K, $250K, $500K, etc.), varying deductibles, with and without collision insurance, and/or any other options the user may be able to select.

In step 211 the estimate or estimates are presented to the user. When multiple estimates are presented to the user, the estimates are preferably presented in a dynamic format or media so the user can explore the assumptions and/or options associated with each estimate. According to an illustrative embodiment, the range of estimates may be presented in a grid where each successive row provides an estimate associated with an increasing level of insurance coverage (e.g., $25K/$50K, $100K/$300K, and $250K/$500K), and each column provides an estimate associated with an increasing number of add-on options associated with the insurance coverage (e.g., accident forgiveness, Deductible Rewards$^{SM}$, Safe Driving Bonus$^{SM}$, etc.).

According to an illustrative embodiment, automobile insurance estimates may be provided in a grid reflecting the following insurance levels (Collision Deductible, Comprehensive Deductible, Bodily Injury limits, Property Damage limit, Medical Payment limit, Uninsured Motorist limits) and add-on options.

interface comprises many different screens as shown below, and may be exposed to the user via web server 105, with resultant estimates computed by rate server 103. Other system architectures may of course be used.

Figure 3:
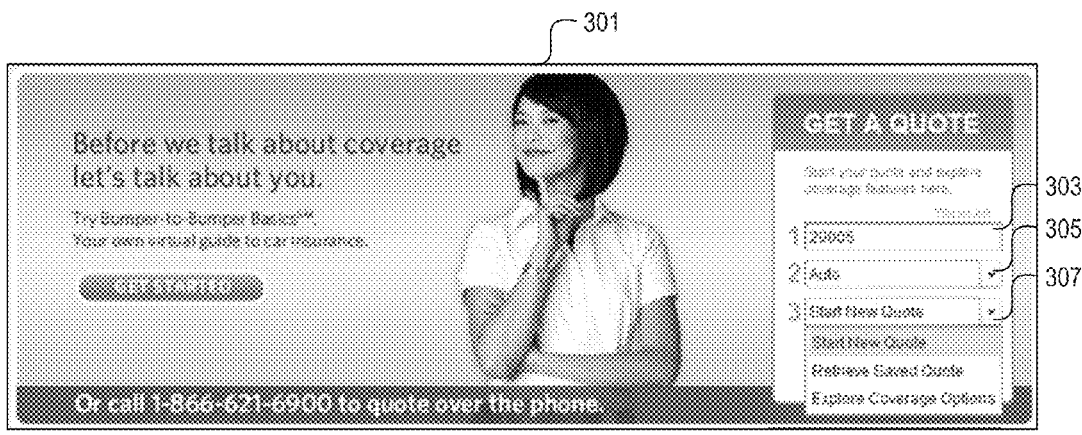
FIG. 3 illustrates a screen shot of a user interface according to an illustrative aspect of the invention.
Figure 4:
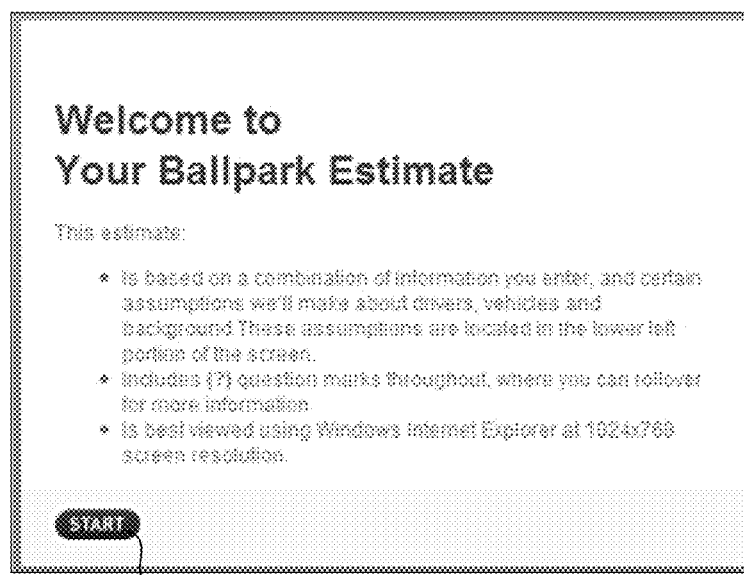
FIG. 4 illustrates a screen shot of a user interface according to an illustrative aspect of the invention.

In FIG. 3, web server 105 displays a first screen 301 providing a general introduction to the consumer, and requesting initial basic information 303, 305, 307. The user inputs his or her zip code 303, the type of insurance 305 for which the user desires to obtain an estimate, and whether the user wants to start a new quote or continue a saved quote in option box 307. Upon entering the information, the web server may display optional screen 401 (FIG. 4) to provide additional information to the user while loading subsequent information, e.g., java, flash, or other applet code or software to the user's client computer 107 or 109 at the direction of web server 105.

Figure 5:
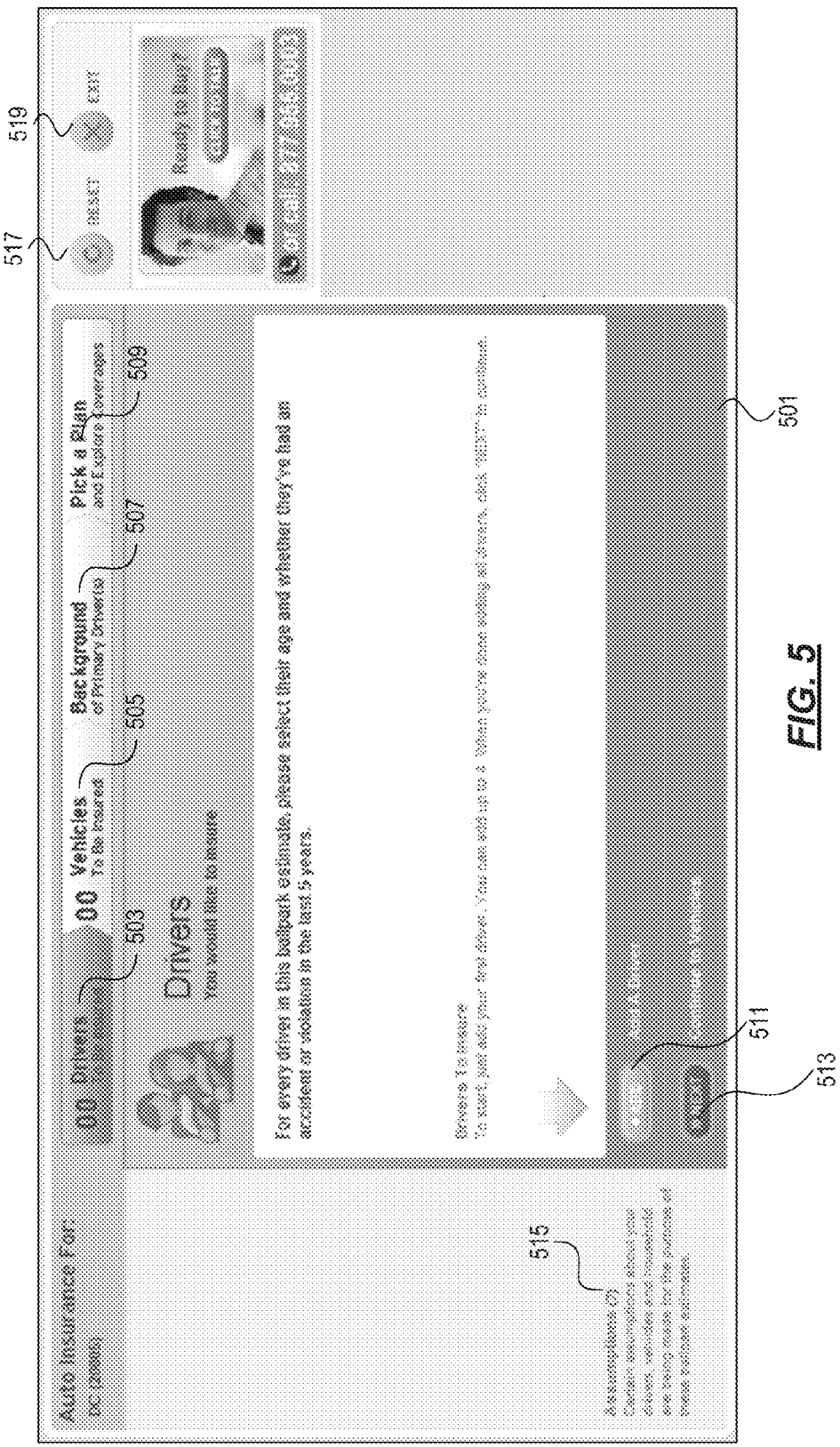
FIG. 5 illustrates a screen shot of a user interface according to an illustrative aspect of the invention.

When the user is ready to begin, the user selects start button 403 and proceeds to user interface 501 illustrated in FIG. 5. In FIG. 5, user interface 501 is presently displaying information regarding Drivers tab 503, through which the user can enter driver information. Other available tabs, discussed further below, include a Vehicles tab 505, Background tab 507, and Pick a Plan tab 509. The user selects Add button 511 to add a

TABLE 2

Sample Grid of Insurance Levels and Add-Ons

| | | | | |
|---|---|---|---|---|
| Coll. Deduct.: | $500 | $500 | $500 | $500 |
| Compr. Deduct.: | $500 | $500 | $500 | $500 |
| Bodily Injury: | $25K/$50K | $25K/$50K | $25K/$50K | $25K/$50K |
| Prop. Damage: | $20K | $20K | $20K | $20K |
| Medical: | None | None | None | None |
| Uninsured Motor.: | $25K/$50K | $25K $50K | $25K/$50K | $25K/$50K |
| Bonus Features | Direct Deposit Payments | Accident Forgiveness | Accident Forgiveness Deductible Rewards$^{SM}$ | Accident Forgiveness Safe Driving Bonus$^{SM}$ Deductible Rewards$^{SM}$ |
| Coll. Deduct.: | $500 | $500 | $500 | $500 |
| Compr. Deduct.: | $500 | $500 | $500 | $500 |
| Bodily Injury: | $100K/$300K | $100K/$300K | $100K/$300K | $100K/$300K |
| Prop. Damage: | $100,000 | $100,000 | $100,000 | $100,000 |
| Medical: | $1,000 | $1,000 | $1,000 | $1,000 |
| Uninsured Motor.: | $100K/$300K | $100K/$300K | $100K/$300K | $100K/$300K |
| Bonus Features | Direct Deposit Payments | Accident Forgiveness | Accident Forgiveness Deductible Rewards$^{SM}$ | Accident Forgiveness Safe Driving Bonus$^{SM}$ Deductible Rewards$^{SM}$ |
| Coll. Deduct.: | $500 | $500 | $500 | $500 |
| Compr. Deduct.: | $500 | $500 | $500 | $500 |
| Bodily Injury: | $250K/$500K | $250K/$500K | $250K/$500K | $250K/$500K |
| Prop. Damage: | $200,000 | $200,000 | $200,000 | $200,000 |
| Medical: | $2,000 | $2,000 | $2,000 | $2,000 |
| Uninsured Motor.: | $250K/$500K | $250K/$500K | $250K/$500K | $250K/$500K |
| Bonus Features | Direct Deposit Payments | Accident Forgiveness | Accident Forgiveness Deductible Rewards$^{SM}$ | Accident Forgiveness Safe Driving Bonus$^{SM}$ Deductible Rewards$^{SM}$ |

Using the above method, users can self declare non-personally identifying information to obtain an estimated amount for an insurance premium, thereby allowing the consumer to remain anonymous. The consumer can then select from a range of insurance packages at varying price points that reflect a broad range of insurance services offered, and the consumer can select the choice that most closely reflects his or her current needs.

Figure 17:
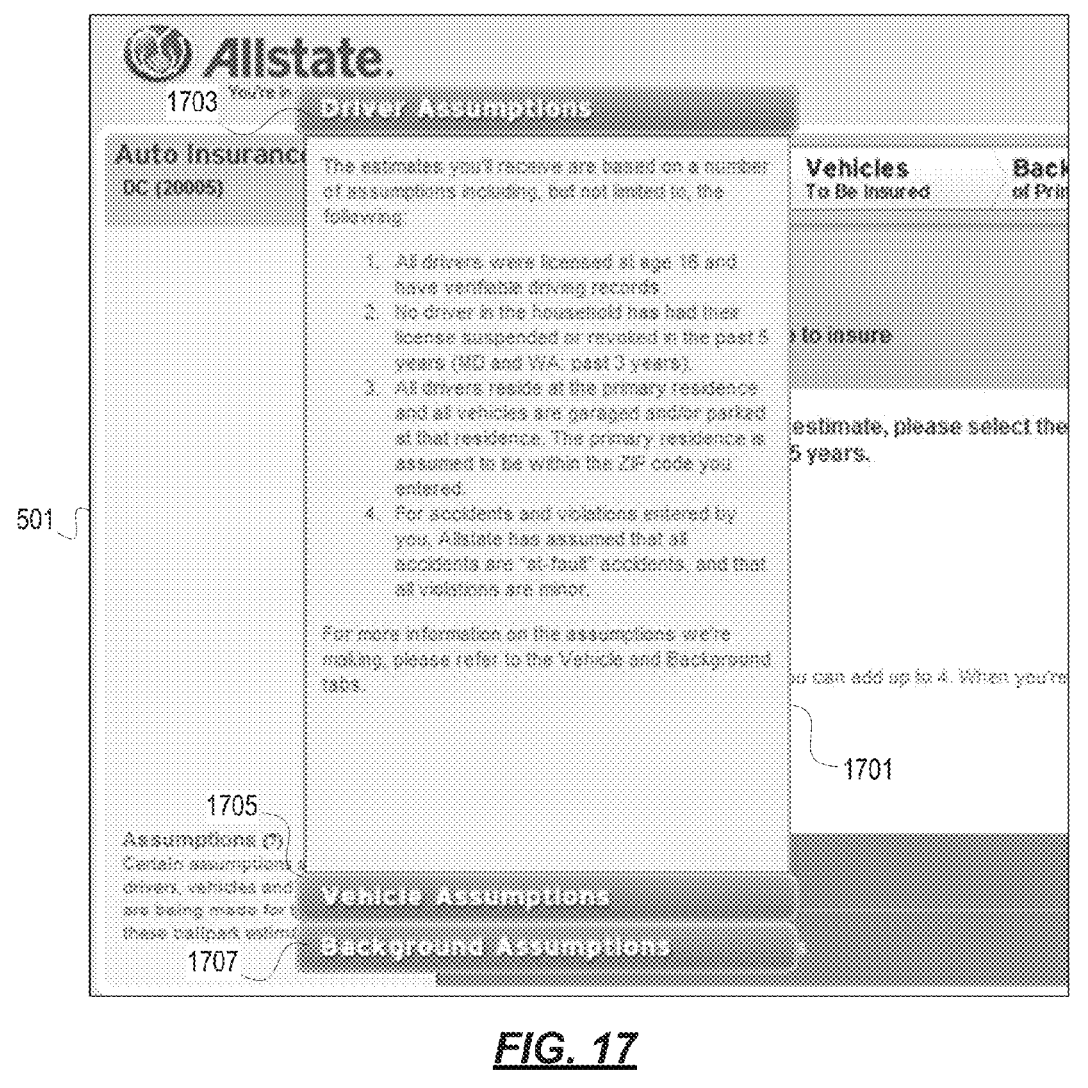

Beginning with FIG. 3, a sample user interface available to consumers over the Internet will now be described. The user driver to the estimate, and Next button 513 to move to the next tab. The user at any time can select or hover over the Assumptions control 515 to learn what assumptions are being made during the estimation process, e.g., Driver Assumptions 1703, Vehicle Assumptions 1705, and Personal (aka, Background) Assumptions 1707, through an assumptions user interface 1701, illustrated in FIG. 17.

Figure 6:
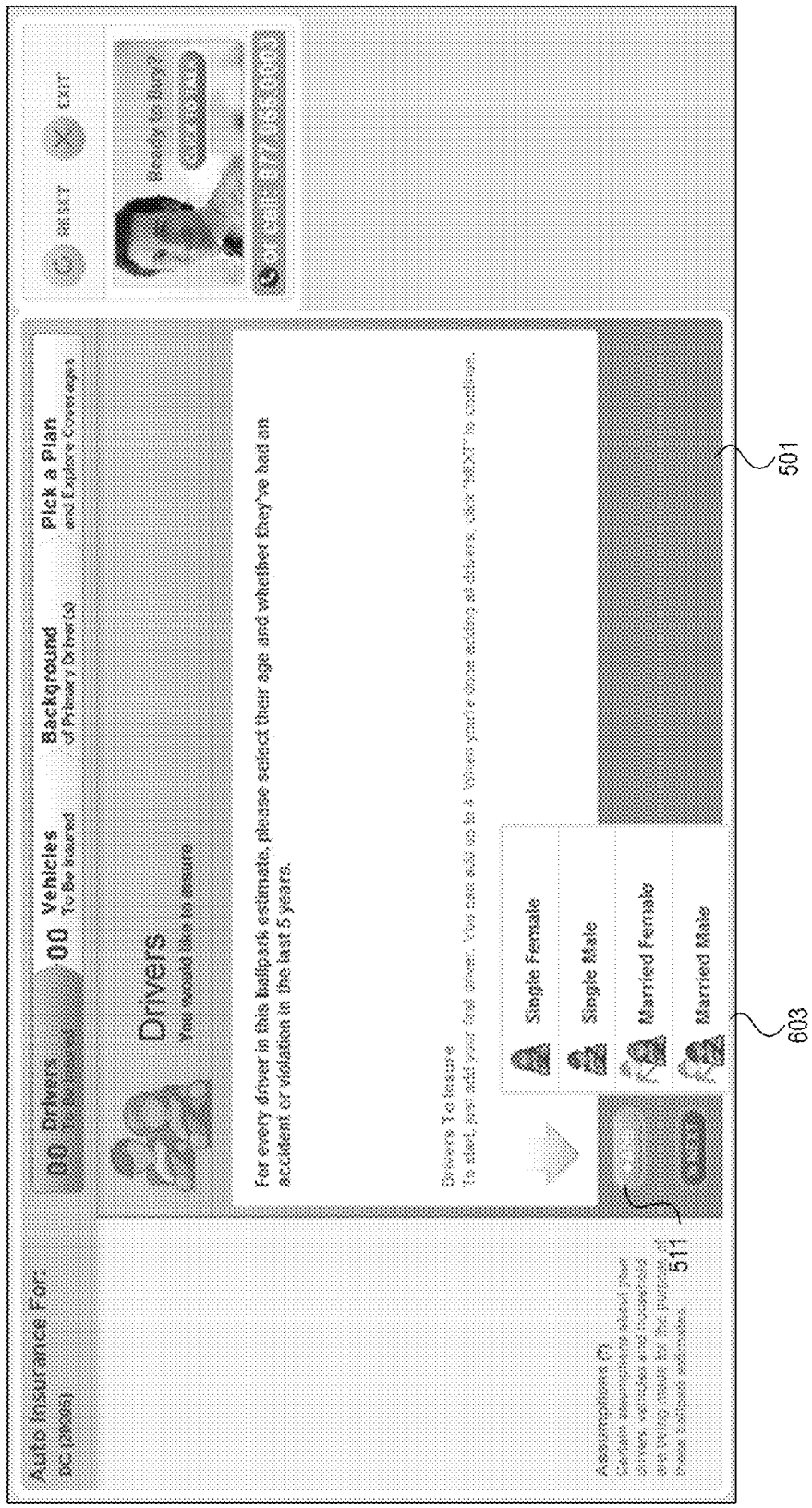
FIG. 6 illustrates a screen shot of a user interface according to an illustrative aspect of the invention.

With reference to FIG. 6, upon selecting Add button 511, web server 105 displays selection list 603 for the user to select gender and marital status of the driver to be added to the insurance quote. As used herein, when web server 106 is indicated as performing some function, that function may be performed by web server 105 directly, or may be performed by software downloaded from web server 105 to the user's computer 107 and executing on the user's computer 107, e.g., a java module, Flash or Shockwave program, etc. Upon selecting one of the gender/marital status options, the user is prompted to enter the driver's age and driving history as illustrated in FIG. 7.

Figure 7:
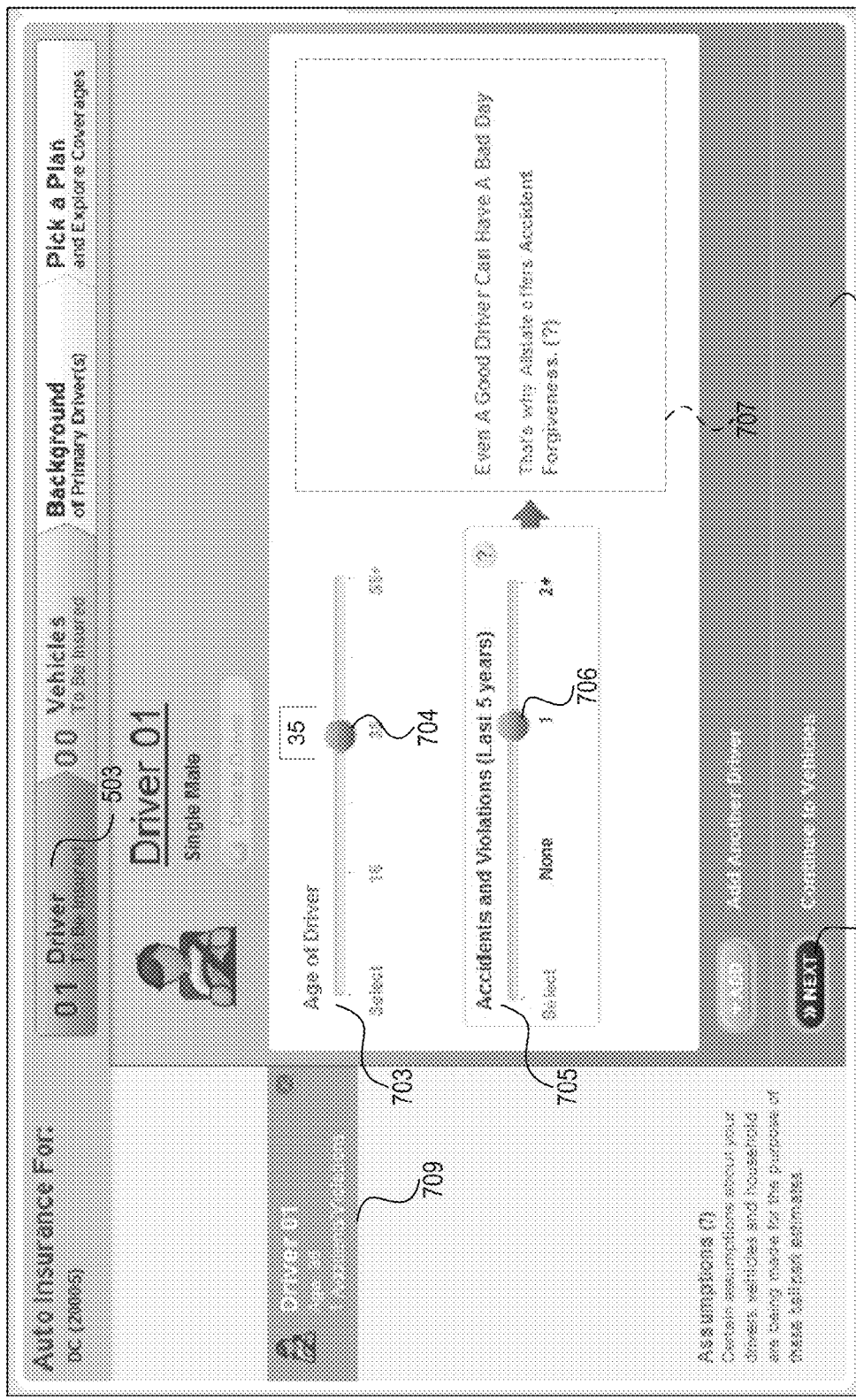
FIG. 7 illustrates a screen shot of a user interface according to an illustrative aspect of the invention.

FIG. 7 illustrates user interface 501 for the Driver tab 503, which now indicates that one (1) driver has been added. User interface 501 also displays an Age input control 703 and Driving History input control 705. Each input control may be any type of user input device, e.g., slider bars, drop down lists, radio buttons, check boxes, text boxes, etc. Here, input controls 703, 705 are sliders, where each position on the slider corresponding to a valid input as defined by the value input filter corresponding to the rate factor for which input is sought. In the case of Age input control 703, the user can slide the slider ball 704 until the desired age is displayed above the ball 704 (here, the selected age of 35 is displayed above the slider ball 704). Next, the user selects the driving history 705 that best corresponds to the driver. The allowable options, again defined by a value input filter, are 0, 1, and 2+, selectable via slider ball 706. On each screen, supplementary information corresponding to the active input control may displayed in information area 707. When the user is satisfied with the input, as confirmed in sidebar 709, the user selects Next button 513.

Figure 8:
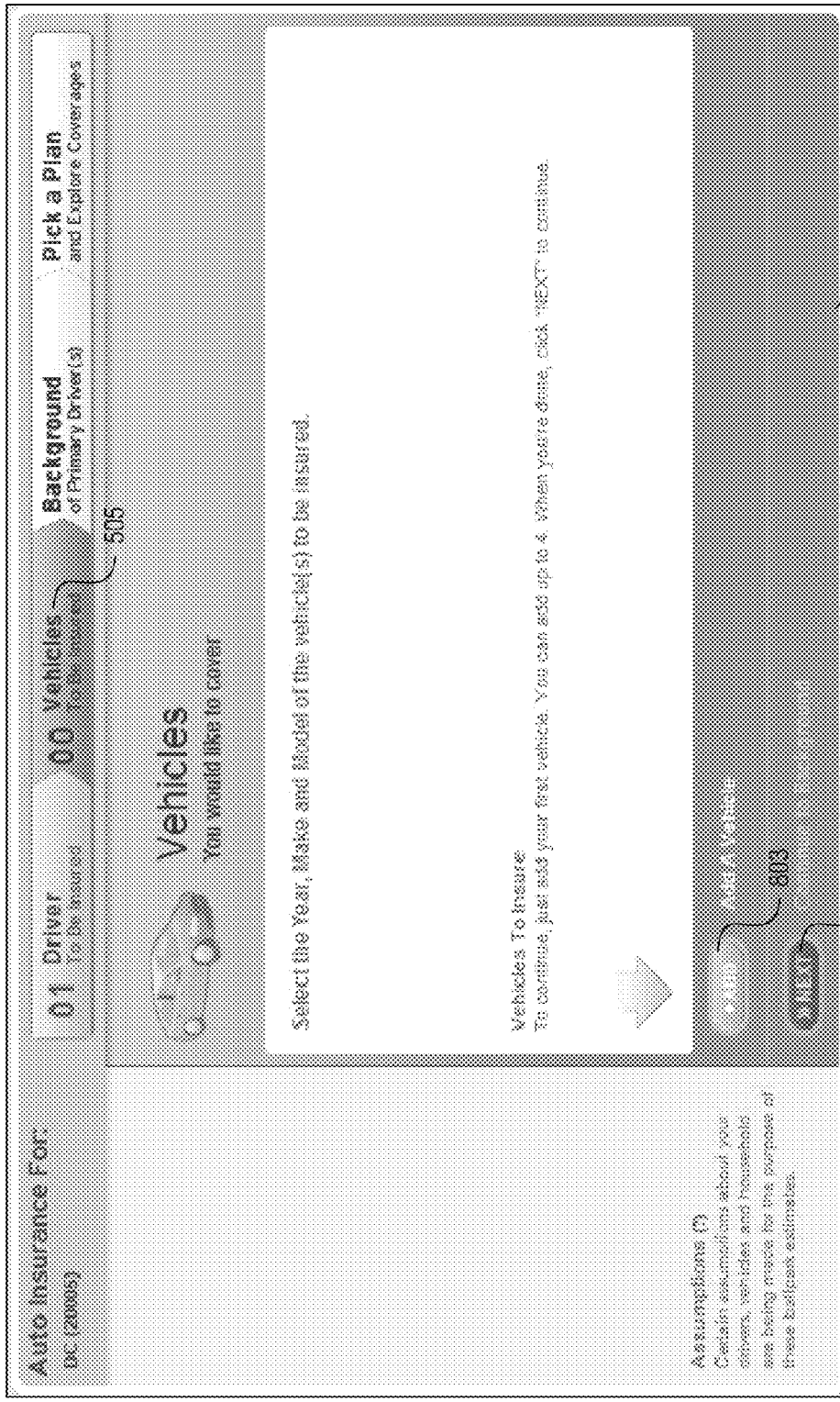
FIG. 8 illustrates a screen shot of a user interface according to an illustrative aspect of the invention.
Figure 9:
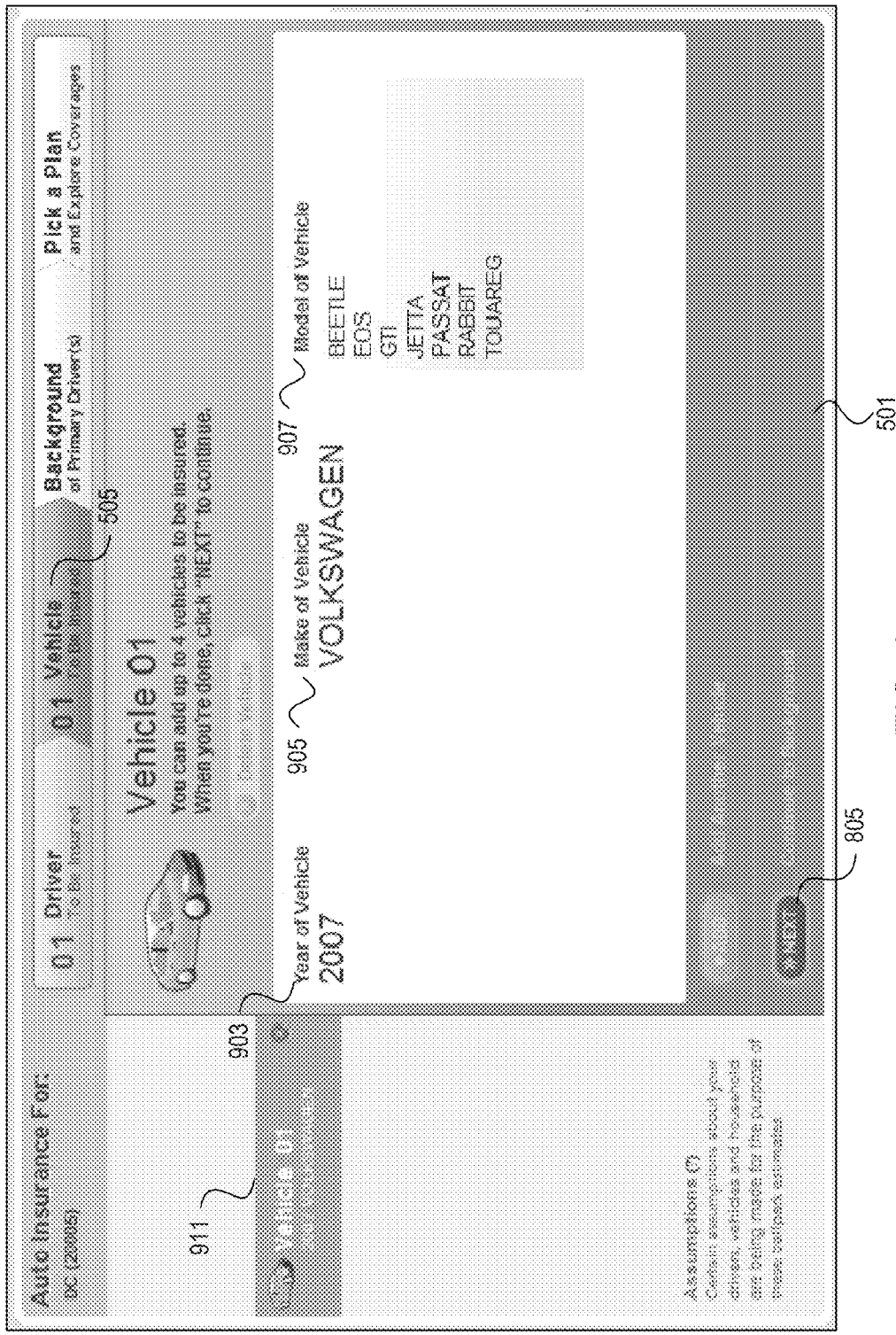
FIG. 9 illustrates a screen shot of a user interface according to an illustrative aspect of the invention.
Figure 10:
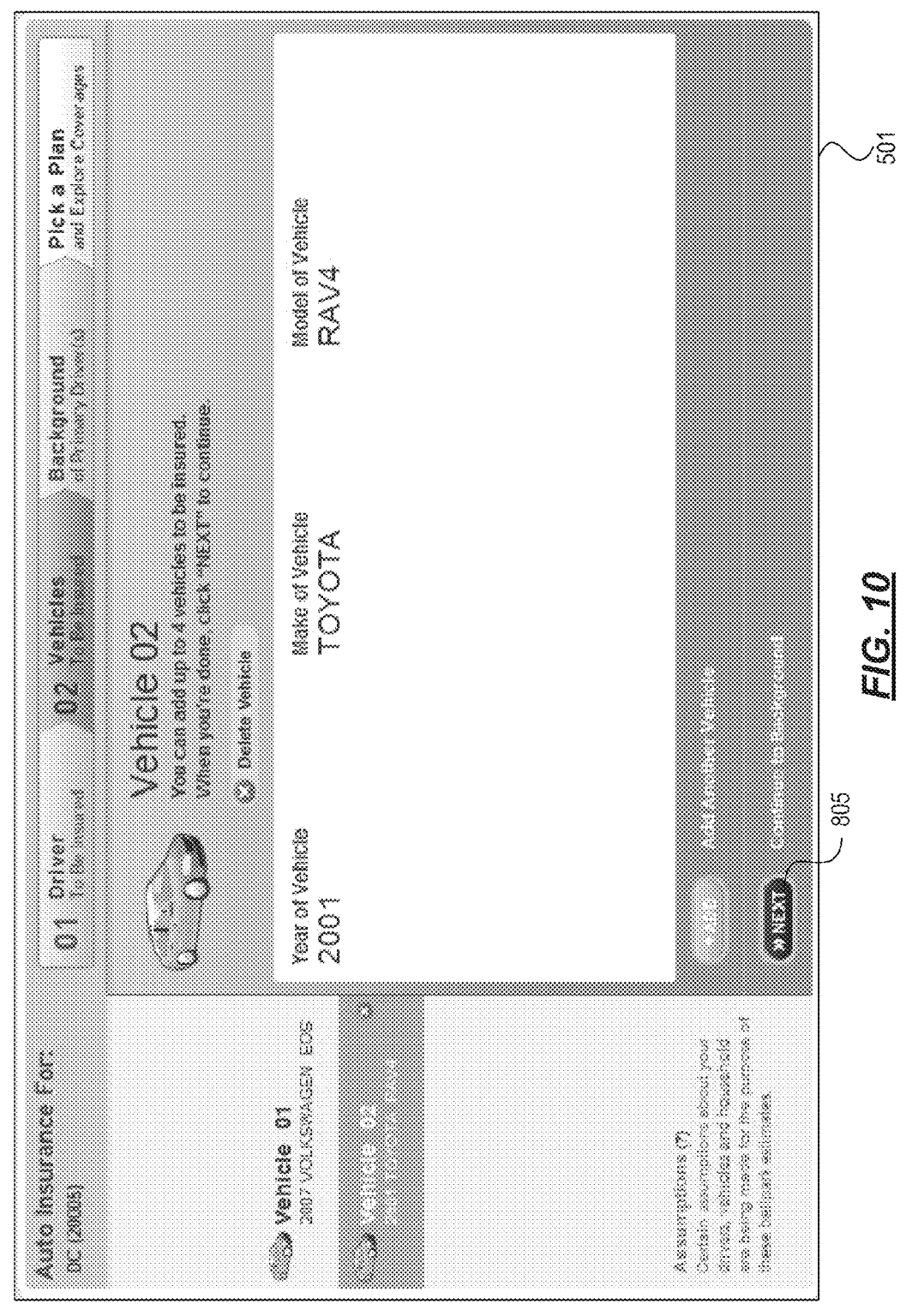

In FIG. 8 user interface 501 now displays the Vehicles tab 505. The Vehicles tab 505 is the screen through which the user enters information regarding each of the vehicles that is to be insured. The user can select Add button 803 to add a vehicle to the estimate, or Next button 805 when done entering vehicle information to move on to the next tab. Upon selecting Add button 803, user interface 501 displays vehicle information input controls 903, 905, 907, as illustrated in FIG. 9. In FIG. 9, user interface 501 displays Vehicle Year input control 903, Vehicle Make input control 905, and Vehicle Model input control 907. Each input control can be any variety of input control, including drop down lists, radio boxes, text input boxes, constrained lists, etc., as are known in the art. In this illustrative embodiment, input controls 903, 905, 907 are drop down lists from which a user can select valid input values as defined by the value input filters corresponding to each of the Vehicle Year input control 903, Vehicle Make input control 905, and Vehicle Model input control 907. The user can confirm the information input via sidebar 911, which displays the input information for each vehicle entered as part of the quote process. User interface 501 also updates Vehicles tab 505 to indicate the number of vehicles that have been added (here, one). Upon completion of entering all desired vehicles, for example as illustrated in FIG. 10 where two vehicles have been entered by the user, the user selects Next button 805 to proceed.

Figure 11:
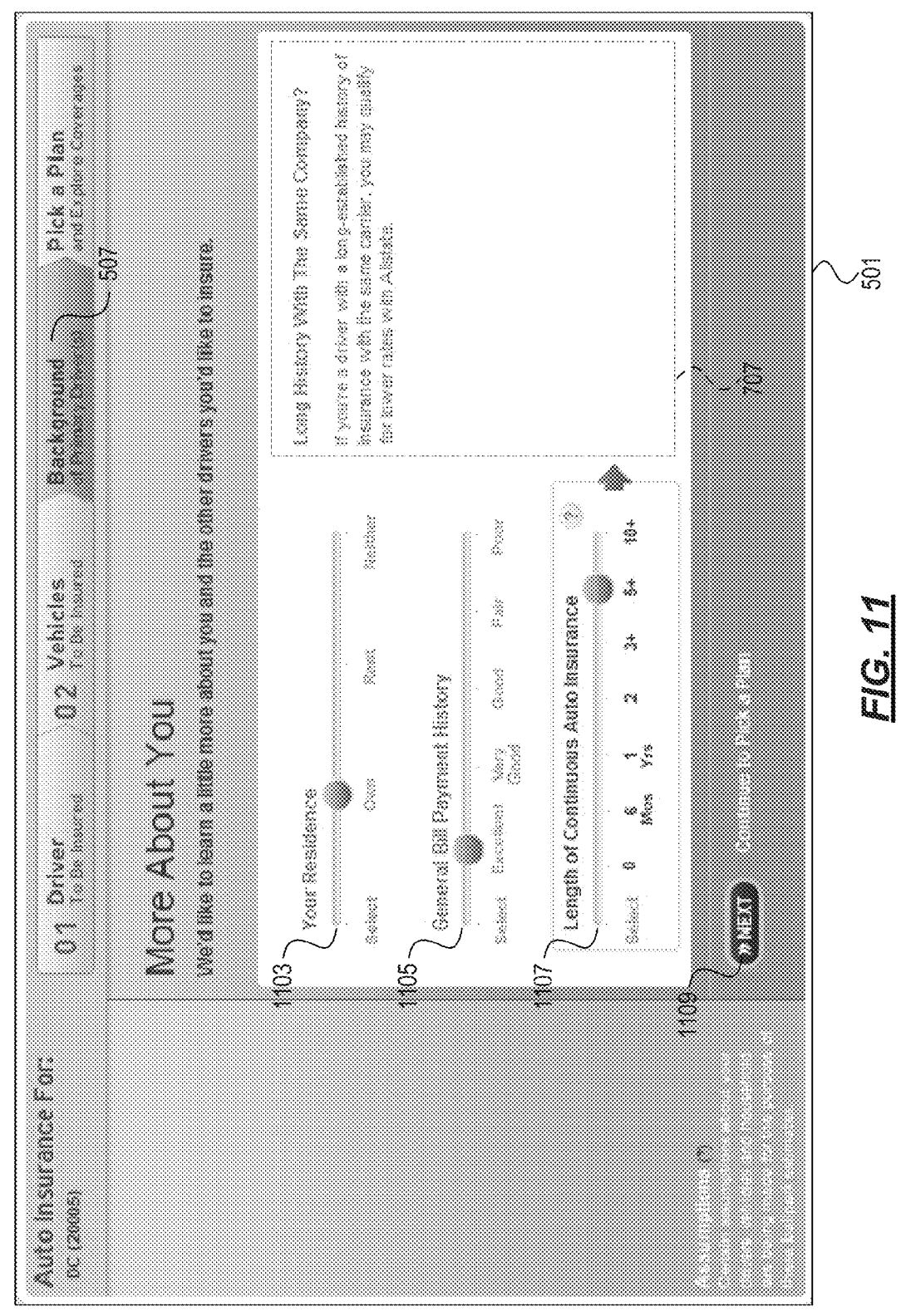

FIG. 11 illustrates user interface 501 displaying the Background tab 507. The Background tab 507 is the screen through which the user enters background information regarding each of the drivers input via the Driver tab 503 (FIG. 7). Background tab 507 includes Residence input control 1103, Bill Payment History input control 1105, and Insurance History input control 1107. Each input control can be any variety of input control, including drop down lists, sliders, radio boxes, text input boxes, constrained lists, etc., as are known in the art. In this illustrative embodiment, input controls 1103, 1105, 1107 are sliders which a user can manipulate into a position corresponding to the desired input value. The slider positions are constrained to valid input values as defined by the value input filters corresponding to each of the Residence input control 1103, Bill Payment History input control 1105, and Insurance History input control 1107. Additional information regarding the active input control may be displayed in information area 707. After entering the requested information, the user selects Next button 1109, which sends the last of the required information to web server 105 and rate server 103 for processing.

Figure 12:
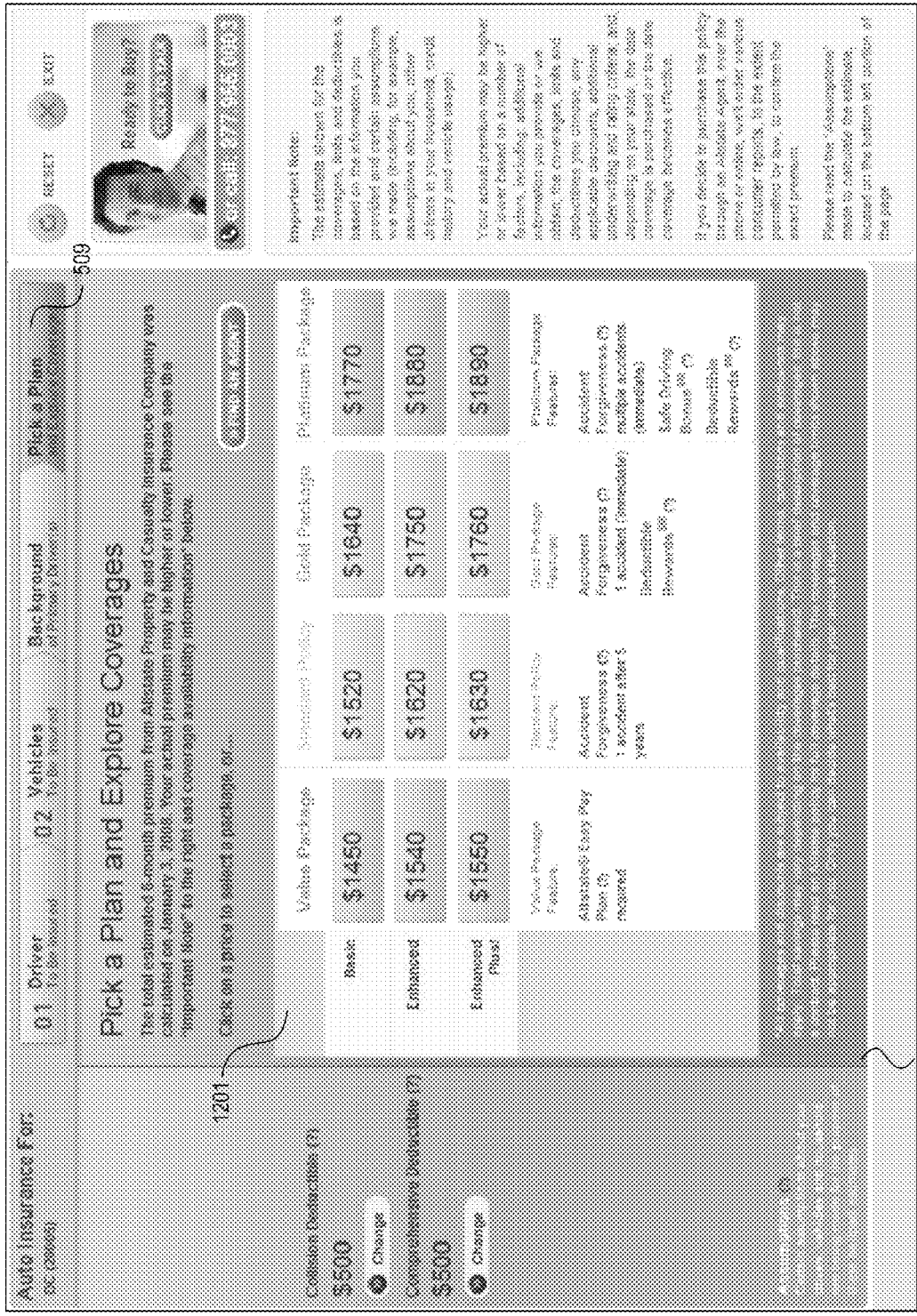
FIG. 12 illustrates a screen shot of a user interface according to an illustrative aspect of the invention.
Figure 13:
FIG. 13 illustrates a screen shot of a user interface according to an illustrative aspect of the invention.
Figure 14:
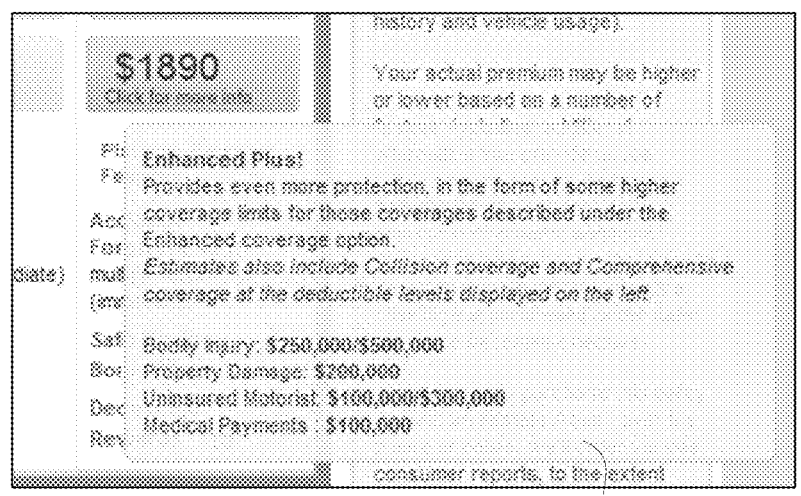
FIG. 14 illustrates a screen shot of a user interface according to an illustrative aspect of the invention.

After rate server 103 has processed the information and compared the information to rate model 129 using any desired rate model, rate server sends rate information to web server 105 for presentation to the user via output grid 1201 displayed in the Pick a Plan tab 509 of user interface 501, e.g., as illustrated in FIG. 12. The output grid 1201, in this illustrative embodiment, displays estimated 6 month premiums corresponding to the levels of insurance and add-ons shown in Table 2, above. When the user hovers over one of the grid entries with his or her mouse, additional information is displayed via popup interface 1301, illustrated in FIG. 13 with respect to the Enhanced Value Package and in FIG. 14 with respect to the Enhanced Plus Platinum Package. Also as illustrated in 1303, when the user hovers over a row, a drop down arrow 1303 may be displayed corresponding to the packages in that row. Upon selection of drop down arrow 1303, detailed descriptive information 1502 common to all packages within that row may be displayed, for example as illustrated in FIG. 15.

Figures 15, 16:
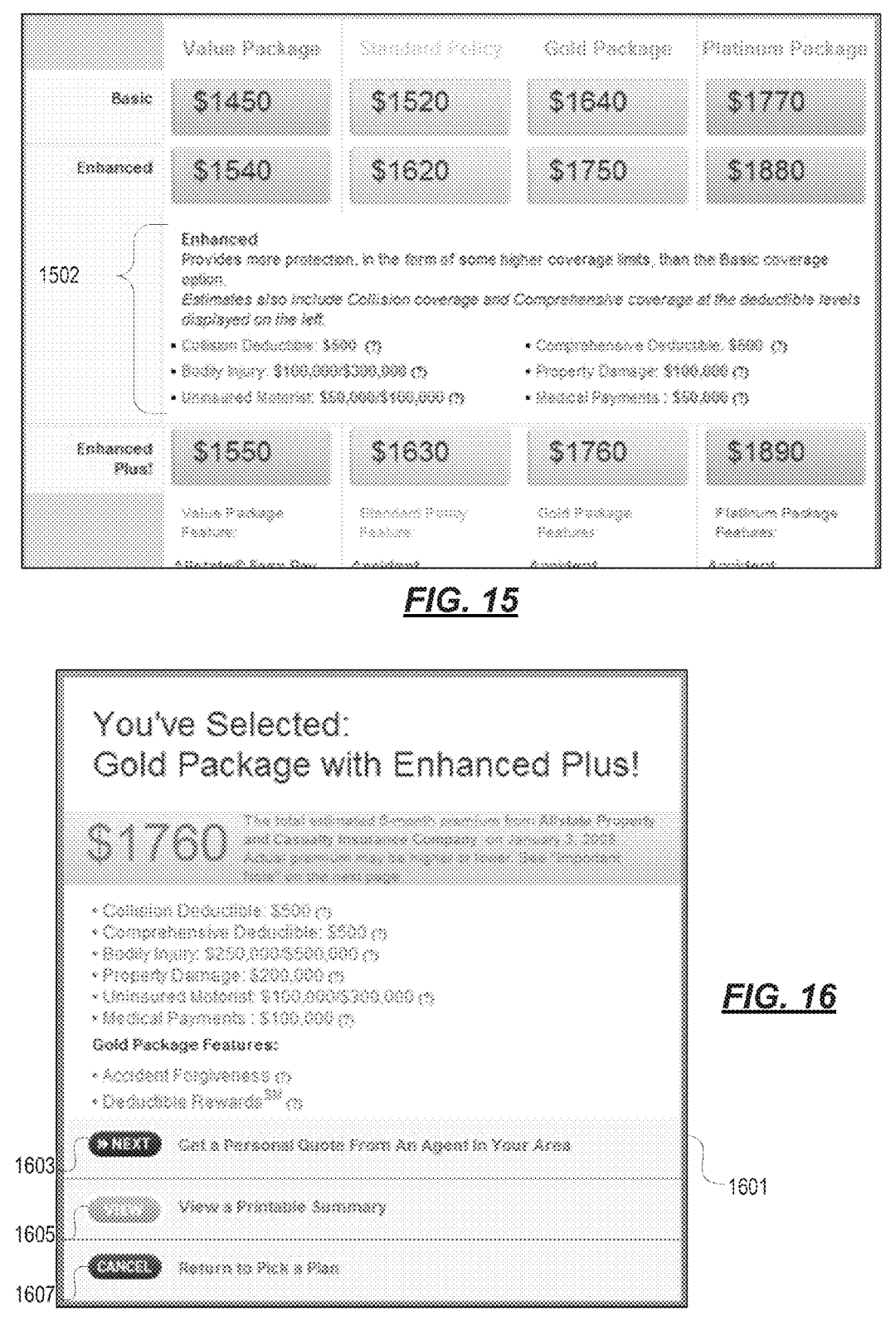

FIG. 16 illustrates informational screen 1601 which may be displayed when the user selects one of the provided estimates, here the Gold Package with Enhanced Plus (i.e., the Gold Package column and Enhanced Plus row of the grid). The estimation process is now complete, and the user can proceed to obtain a firm quote, e.g., from a local agent, via input button 1603, print the estimate via input control 1605, or cancel and return to the grid via input control 1607.

At any point during the above process the user can roll/hover over informational icons, appearing in this illustrative embodiment as question marks in parentheses "(?)" displayed on the various user interface screens, to obtain additional information regarding the item next to which the informational icon (?) appears. Also at any time during the process the user can reset all the information entered so far via Reset input control 517 (FIG. 5), or cancel out of the entire process via Cancel input control 519 (FIG. 5).

Figure 18:
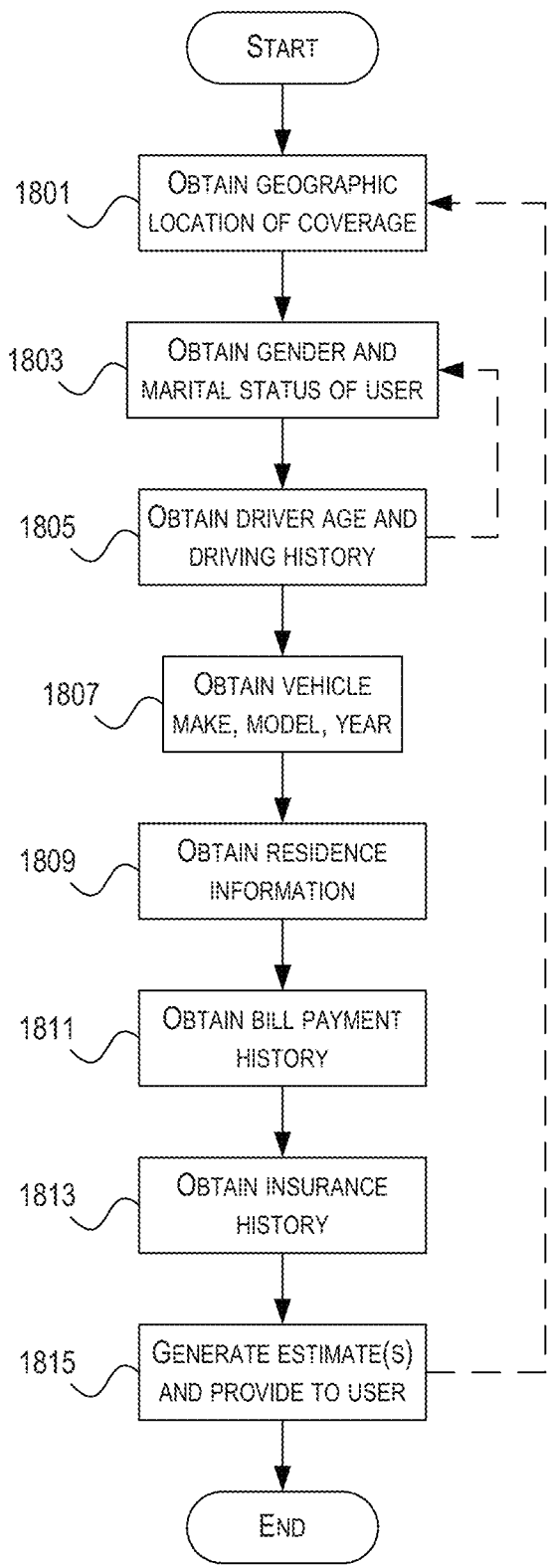
FIG. 18 illustrates a method of providing an insurance estimate according to an illustrative aspect of the invention.

FIG. 18 illustrates the method depicted in FIGS. 3-17. Initially, in step 1801, as illustrated in FIG. 3 the rate server obtains the desired geographic location of coverage, e.g., via a user interface provided to the user via web server 105 and client computer 107 or 109. Next, in step 1803, the user inputs the gender and marital status for the first driver. The gender uses the value input filter [male, female], and marital status uses the value input filter [single, married]. According to some embodiments, gender and marital status may be provided simultaneously. In step 1805 the user provides the age and driving history for the first driver. Age is provided according to a value input filter of [16, 17, . . . , 54, 55+], and driving history uses the value input filter [0, 1, 2+]. Steps 1803 and 1805 are illustrated in FIGS. 5-7. If there are additional drivers to be insured, the method returns back to step 1803 to obtain driver information for each additional driver from the user.

In step 1807 the user provides the year, make, and model for each vehicle to be insured. The vehicle year is preferably provided first according to a value input filter similar to [1970, 1971, . . . , <present year>]. The make is then selected from a value input filter that includes all manufacturers that manufactured an insurable car during the selected year. The model is selected from a value input filter that includes all insurable models manufactured by the selected manufacturer. Step 1807 is illustrated further in FIGS. 8-10.

In step 1809 the system obtains residence information from the user, indicating whether the user owns or rents (or neither) his or her home. The value input filter [own, rent, neither] may be used. In step 1811 the user provides a self declaration of bill payment history based on a value input filter similar to [Excellent, Very Good, Good, Fair, Poor], and in step 1813 provides a self declaration of prior insurance history. The prior insurance history may be entered according to the value input filter [0, 0.5, 1, 2, 3+, 5+, 10+], where the selected value is in years. Steps 1809-1813 are illustrated further in FIG. 11. Allowing users to self-declare information helps to alleviate privacy concerns, because the user is not required to authorize the insurer to obtain personal information from alternative sources.

After the user completes the data entry portions of the process, the rate server in step 1815 generates one or more insurance estimates based on the received information, and displays the generated estimate(s) to the user via a user interface, e.g., an interactive dynamic user interface as illustrated in FIGS. 12-17. If the user desires to obtain another estimate, the method may return to step 1801, otherwise the estimation process ends. The steps illustrated in FIG. 18 may be reordered, combined, or split, without affecting the usability of the data. In addition, the data may be obtained via a user interface, or may be manually entered by an employee of the insurer (e.g., a customer service representative) based on verbal information given to the employee by the user over the phone, via written information received on an estimate inquiry form, or via other communication media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of providing an automobile insurance estimate, comprising:
   receiving at an insurance rate computer, first user input identifying a geographic location in which the insured vehicles reside, wherein the first user input does not comprise any personal identifying information;
   receiving at the insurance rate computer, second user input identifying marital status, gender, age, and driving history for each of one or more drivers to be insured, wherein the second user input does not comprise any personal identifying information;
   receiving at the insurance rate computer, third user input identifying a vehicle make, vehicle model, and vehicle year for each of one or more vehicles to be insured, wherein the third user input does not comprise a vehicle identification number (VIN) and does not comprise any personal identifying information;
   the insurance rate computer determining a plurality of estimated insurance premiums based on the received first through third user inputs; and providing the estimated insurance premiums for communication to the user.

2. The method of claim 1, wherein each of the plurality of estimated insurance premiums is based on a different level of insurance coverage.

3. The method of claim 2, wherein the different levels of insurance coverage are selected based on popularity.

4. The method of claim 1, wherein each of the plurality of estimated insurance premiums is based on a different set of insurance add-ons.

5. One or more tangible computer readable media storing computer readable instructions that, when executed, perform a method of providing an automobile insurance estimate, comprising:
   receiving first user input identifying a geographic location in which the insured vehicles reside, wherein the first user input does not comprise any personal identifying information;
   receiving second user input identifying marital status, gender, age, and driving history for each of one or more drivers to be insured, wherein the second user input does not comprise any personal identifying information;
   receiving third user input identifying a vehicle make, vehicle model, and vehicle year for each of one or more vehicles to be insured, wherein the third user input does not comprise a vehicle identification number (VIN) and does not comprise any personal identifying information;
   determining a plurality of estimated insurance premiums based on the received first through third user inputs; and
   providing the estimated insurance premiums for communication to the user.

6. The computer readable media of claim 5, wherein each of the plurality of estimated insurance premiums is based on a different level of insurance coverage.

7. The computer readable media of claim 6, wherein the different levels of insurance coverage are selected based on popularity.

8. The computer readable media of claim 5, wherein each of the plurality of estimated insurance premiums is based on a different set of insurance add-ons.

9. A data processing system, comprising:
   a processor;
   memory storing insurance rate model data and computer readable instructions that, when executed by the processor, determine a plurality of automobile insurance estimates from the rate model data based on driver information, vehicle information, and background information received as user input received via a user interface;
   memory storing computer readable instructions that, when executed, cause the user interface to be displayed on a client computer, said user interface comprising:
      a driver information input module that receives the driver information from a user for one or more drivers, said driver information for each driver comprising gender, marital status, age, and driving history;
      a vehicle information input module that receives the vehicle information from the user for one or more vehicles, said vehicle information for each vehicle comprising year, make and model;
      a background information input module that receives the background information for a prospective automobile insurance estimate, said background information comprising residence information, a self-declaration of bill payment history by the user, and automobile insurance history; and
      an output module that displays the plurality of automobile insurance estimates based on increasing levels of insurance associated with each estimate, and based on increasing levels of add-on features associated with each estimate.

10. The system of claim 9, wherein when the user hovers an input device over one of the plurality of automobile insurance estimates the output module displays additional information associated with the one of the plurality of automobile insurance estimates in a pop-up window.

11. The system of claim 9, wherein when the user selects one of the automobile insurance estimates the output module displays a summary screen comprising levels of insurance and add-on features associated with the selected one of the automobile insurance estimates.

12. The system of claim 9, wherein the output module displays the plurality of automobile insurance estimates without receiving any personal identifying information about the user.

13. The system of claim 9, wherein the driver information, for each driver, consists of gender, marital status, age, and driving history, wherein the vehicle information, for each vehicle, consists of year, make and model, and wherein the background information consists of the residence information, the self-declaration of bill payment history by the user, and the automobile insurance history.

14. One or more tangible computer readable media storing computer readable instructions that, when executed, cause a computer system to perform:
    receiving at an insurance rate computer, first user input identifying geographic information, wherein the geographic information does not comprise any personal identifying information;
    receiving at the insurance rate computer, second user input identifying personal information for each of one or more drivers to be insured, wherein the personal information does not comprise any personal identifying information;
    receiving at the insurance rate computer, third user input identifying vehicle information for each of one or more vehicles to be insured, wherein the vehicle information does not comprise a vehicle identification number (VIN) and does not comprise any personal identifying information; and
    determining at the insurance rate computer a plurality of estimated insurance premiums based on the received geographic information, personal information, and vehicle information; and providing the estimated insurance premium for communication to the user.

15. The computer readable media of claim 14, wherein each of the estimated insurance premiums is based on a different level of insurance coverage.

16. The computer readable media of claim 14, wherein each of the estimated insurance premiums is based on a different set of insurance add-ons.

17. An insurance rate computer system, comprising:
    a processor;
    a network interface; and
    an insurance rate computer system memory storing a rate model in a database and further storing computer readable instructions that, when executed by the processor, cause the insurance rate computer system to perform:
        receiving, via the network interface, first user input identifying geographic information, wherein the geographic information does not comprise any personal identifying information;
        receiving, via the network interface, second user input identifying personal information for each of one or more drivers to be insured, wherein the personal information does not comprise any personal identifying information;
        receiving, via the network interface, third user input identifying vehicle information for each of one or more vehicles to be insured, wherein the vehicle information does not comprise a vehicle identification number (VIN) and does not comprise any personal identifying information; and
        determining a plurality of estimated insurance premiums from the rate model based on the received geographic information, personal information, and vehicle information; and providing the estimated insurance premiums for communication to the user.

18. The insurance rate computer system of claim 17, wherein each of the estimated insurance premiums is based on a different level of insurance coverage.

19. The insurance rate computer system of claim 17, wherein each of the estimated insurance premiums is based on a different set of insurance add-ons.

20. A method of providing an automobile insurance estimate, comprising:
    receiving at an insurance rate computer, first user input identifying geographic information, wherein the geographic information does not comprise any personal identifying information;
    receiving at the insurance rate computer, second user input identifying personal information for each of one or more drivers to be insured, wherein the personal information does not comprise any personal identifying information;
    receiving at the insurance rate computer, third user input identifying vehicle information for each of one or more vehicles to be insured, wherein the vehicle information does not comprise a vehicle identification number (VIN) and does not comprise any personal identifying information;
    the insurance rate computer determining a plurality of estimated insurance premiums based on the received geographic information, personal information, and vehicle information; and providing the estimated insurance premium for communication to the user.

21. The method of claim 20, wherein each of the estimated insurance premiums is based on a different level of insurance coverage.

22. The method of claim 20, wherein each of the estimated insurance premiums is based on a different set of insurance add-ons.

* * * * *